US012096792B2

(12) United States Patent
Guo et al.

(10) Patent No.: US 12,096,792 B2
(45) Date of Patent: Sep. 24, 2024

(54) DETACHABLE AEROSOL-GENERATING ARTICLE

(71) Applicant: Shenzhen First Union Technology Co., Ltd., Shenzhen (CN)

(72) Inventors: Yonglu Guo, Shenzhen (CN); Xianyong Yin, Shenzhen (CN); Yonghai Li, Shenzhen (CN); Zhongli Xu, Shenzhen (CN)

(73) Assignee: Shenzhen First Union Technology Co., Ltd., Shenzhen (CN)

( * ) Notice: Subject to any disclaimer, the term of this patent is extended or adjusted under 35 U.S.C. 154(b) by 1463 days.

(21) Appl. No.: 16/518,995

(22) Filed: Jul. 23, 2019

(65) Prior Publication Data

US 2020/0022415 A1 Jan. 23, 2020

(30) Foreign Application Priority Data

Jul. 23, 2018 (CN) ......................... 201810812863.7
Jul. 23, 2018 (CN) ......................... 201821169966.8

(51) Int. Cl.
*A24F 47/00* (2020.01)
*A24F 40/40* (2020.01)
(Continued)

(52) U.S. Cl.
CPC .............. *A24F 40/40* (2020.01); *A24F 40/42* (2020.01); *A24F 40/46* (2020.01); *A24F 40/485* (2020.01);
(Continued)

(58) Field of Classification Search
CPC ........ A24F 40/40; A24F 40/42; A24F 40/485; A24F 40/46; A24F 40/10; H05B 3/03; H05B 3/06; H05B 2203/021
See application file for complete search history.

(56) References Cited

U.S. PATENT DOCUMENTS

2016/0219934 A1* 8/2016 Li et al. .............. A47J 43/1075 416/169 R

FOREIGN PATENT DOCUMENTS

CN 204812039 U 12/2015
CN 205266976 U 6/2016
(Continued)

OTHER PUBLICATIONS

Machine translation of WO 2017/166263 A1, 9 pages (Year: 2017).*

*Primary Examiner* — Dionne W. Mayes
(74) *Attorney, Agent, or Firm* — Proi Intellectual Property US

(57) ABSTRACT

A detachable aerosol-generating article is disclosed, the article includes: a cartridge, with a reservoir and a path formed therein; the path formed inside the reservoir and an atomizer, disposed inside the path and detachably connected with the cartridge; the cartridge further includes a first tube and a second tube; the second tube is sleeved on the first tube; the first tube and the second tube are relatively rotatable to each other; and the path is formed inside the first tube; the first tube is bored with a first liquid conductive hole; the second tube is bored with a second liquid conductive hole; when the cartridge and the atomizer are assembled, the first liquid conductive hole is aligned with the second liquid conductive hole, enabling tobacco liquid in the reservoir to flow to the atomizer; when the cartridge and the atomizer are detached.

10 Claims, 11 Drawing Sheets

(51) Int. Cl.

| | |
|---|---|
| ***A24F 40/42*** | (2020.01) |
| ***A24F 40/46*** | (2020.01) |
| ***A24F 40/485*** | (2020.01) |
| ***H05B 3/03*** | (2006.01) |
| ***H05B 3/06*** | (2006.01) |
| *A24F 40/10* | (2020.01) |

(52) U.S. Cl.
CPC ................ *H05B 3/03* (2013.01); *H05B 3/06* (2013.01); *A24F 40/10* (2020.01); *H05B 2203/021* (2013.01)

(56) References Cited

FOREIGN PATENT DOCUMENTS

| | | | |
|---|---|---|---|
| CN | 206119189 | U | 4/2017 |
| CN | 106666833 | A | 5/2017 |
| CN | 206659108 | U | 11/2017 |
| CN | 107708450 | A | 2/2018 |
| CN | 107927910 | A | 4/2018 |
| CN | 108289502 | U | 7/2018 |
| CN | 209251746 | U | 8/2019 |
| CN | 209251747 | U | 8/2019 |
| EP | 3 287 018 | A1 | 2/2018 |
| EP | 3 305 110 | A2 | 4/2018 |
| WO | 2017113106 | A1 | 7/2017 |
| WO | 20170166263 | A1 | 10/2017 |

* cited by examiner

DETACHABLE AEROSOL-GENERATING ARTICLE

CROSS REFERENCE TO RELATED APPLICATIONS

The present application claims priority to Chinese Patent Application CN2018108128637 filed on Jul. 23, 2018 and Chinese Patent Application CN201821169966.8 filed on Jul. 23, 2018, which are hereby incorporated by reference herein as if set forth in its entirety.

TECHNICAL FIELD

The present disclosure relates to the field of heated aerosol-generating articles, and particularly to a detachable aerosol-generating article.

BACKGROUND ART

A heated aerosol-generating article as an electronically-operated product mimicking traditional cigarettes has advantages of safety, convenience, healthy and environmental friendly, which is widely applied to our daily life.

Currently, a disposable aerosol-generating article typically integrates a cartridge and a atomizer. When a liquid aerosolizable material (i.e. tobacco liquid) is used out in the aerosol-generating article, the cartridge and the atomizer would be discarded together.

During the invention process, the inventors found that the atomizer can be reused after the liquid aerosolizable material is used out, while discarding the cartridge and the atomizer both causes cost-wasting over time.

SUMMARY

To overcome the above drawbacks, the present disclosure generally relates to a detachable aerosol-generating article which may resolve a technical problem that the cartridge and the atomizer have to be discarded together in the prior art.

In order to resolve the technical problem, the present disclosure provides a detachable aerosol-generating article according to independent claim 1 whereas various embodiments of the aerosol-generating article and improvements thereto are recited therein. The article includes: a cartridge, with a reservoir and a path formed therein; the path formed inside the reservoir and an atomizer, disposed inside the path and detachably connected with the cartridge; the cartridge further comprises a first tube and a second tube; the second tube is sleeved on the first tube; the first tube and the second tube are relatively rotatable to each other; and the path is formed inside the first tube; the first tube is bored with a first liquid conductive hole; the second tube is bored with a second liquid conductive hole; when the cartridge and the atomizer are assembled, the first liquid conductive hole is aligned with the second liquid conductive hole, thus allowing tobacco liquid in the reservoir to flow to the atomizer; when the cartridge and the atomizer are detached, the first liquid conductive hole and the second liquid conductive hole are misaligned with each other, thus preventing the tobacco liquid in the reservoir from leaking out.

As used herein, the detachable aerosol-generating article further includes a mouthpiece at a mouth end of the detachable aerosol-generating article and a distal end of the detachable aerosol-generating article upstream from the mouth end; upstream of the mouth piece has a shaft with protrusions; the atomizer has a connector; the connector is detachably connected with the shaft in the path such that when the mouthpiece is detached from the atomizer, the cartridge is detached from the atomizer.

As used herein, the shaft includes a first protrusion, downstream of the connector has a clamping portion, the first protrusion is clamped by the clamping portion.

As used herein, the shaft includes a second protrusion, downstream of the first tube has a groove, the second protrusion is received in the groove such that the first tube rotates with the mouthpiece.

As used herein, the cartridge includes a first shell and a base; the base is disposed upstream of the first shell; the first tube is carried on the first shell and extends to the base; the first tube, the first shell and the base encompass a reservoir.

As used herein, the atomizer includes an atomizing assembly disposed inside the path; the atomizing assembly includes a heater and a liquid conductive element, the liquid conductive element is sleeved on the heater; an air flow path is formed inside the heater.

As used herein, the base includes a first base and a second base; the second base is upstream of the first base; an downstream side of the second base is bored with an aeration slot for forming an air inlet path when the first base is engaged with the second base; the air inlet path is in communication with the air flow path.

As used herein, the atomizer further includes a supporter, the supporter having a receivable part; the receivable part and the connector are abutting each other and both are sleeved on the liquid conductive element; the receivable part is bored with a third liquid conductive hole; the third liquid conductive hole is aligned with the second liquid conductive hole.

As used herein, the supporter includes a connecting part; the atomizer includes a third tube and a basal plug; the basal plug is secured with the connecting part; the third tube is sleeved on the connector, the supporter and the basal plug such that the connector, the supporter and the basal plug are secured.

As used herein, the article further includes a power supply device; the power supply device includes a power supply set; the power supply set is disposed inside the power supply device; the heater further includes an electrode mast, the electrode mast successively passes through the connecting part and the basal plug to electrically connect power supply set for supplying power to the heater to atomize the tobacco liquid.

Compared to the prior art, the atomizer is disposed inside the path that is formed inside the first tube; the first tube and the second tube are relatively rotatable to each other; when the cartridge and the atomizer are assembled, the first liquid conductive hole and the second liquid conductive hole are aligned with each other; when the cartridge and the atomizer are detached, the first liquid conductive hole and the second liquid conductive hole are misaligned to prevent the tobacco liquid from leaking out, which may effectively avoid environmental pollution without affecting the usage of the atomizer.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Provided herein are an electronically-operated aerosol-generating article (alternatively referred to as vaporization devices or electronic vaping devices etc.) generally heats a liquid aerosolizable material (i.e. tobacco liquid) containing nicotine to generate an aerosol, eventually drawn by the users.

Figure 1:
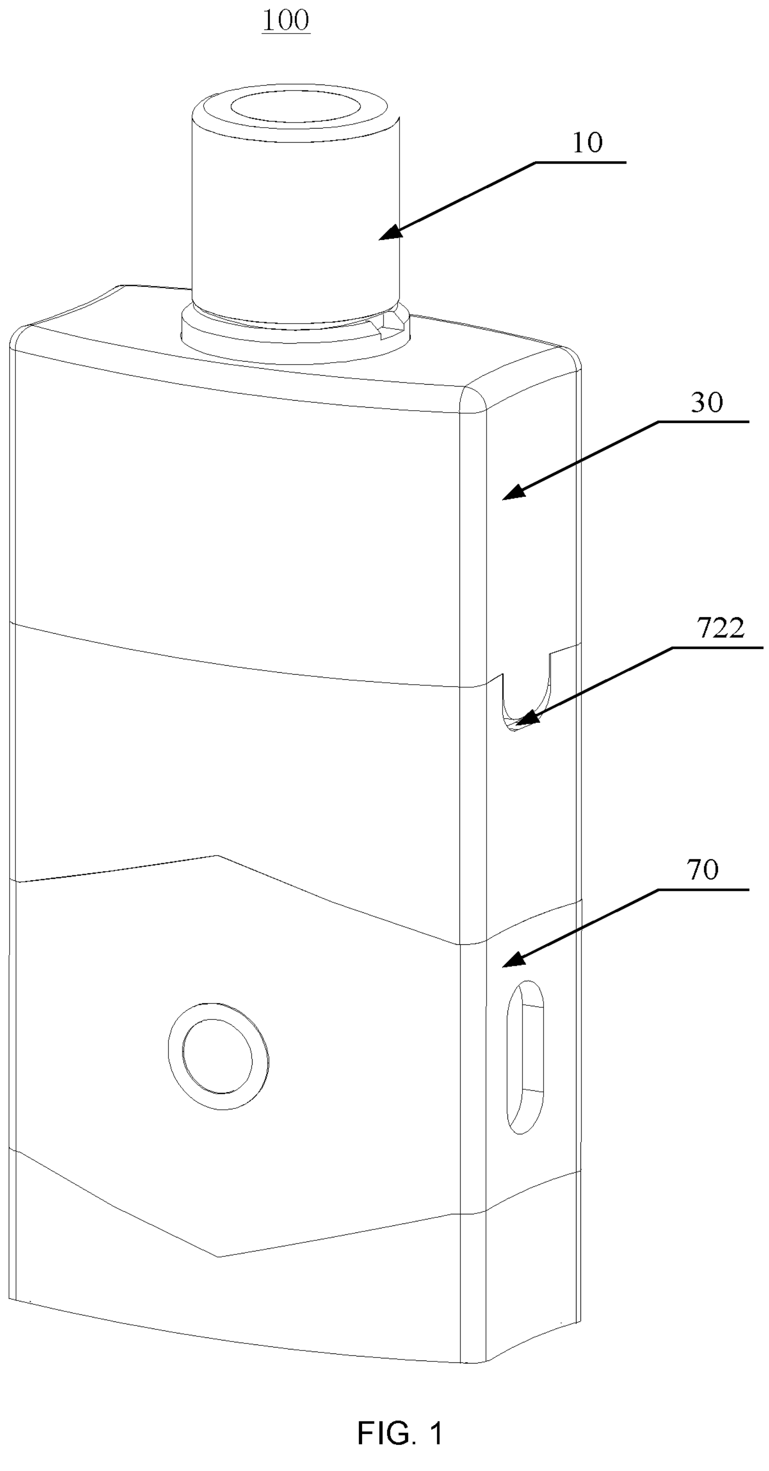
FIG. 1 is an aspect view of an aerosol-generating article according to an embodiment of the present disclosure.
Figure 2:
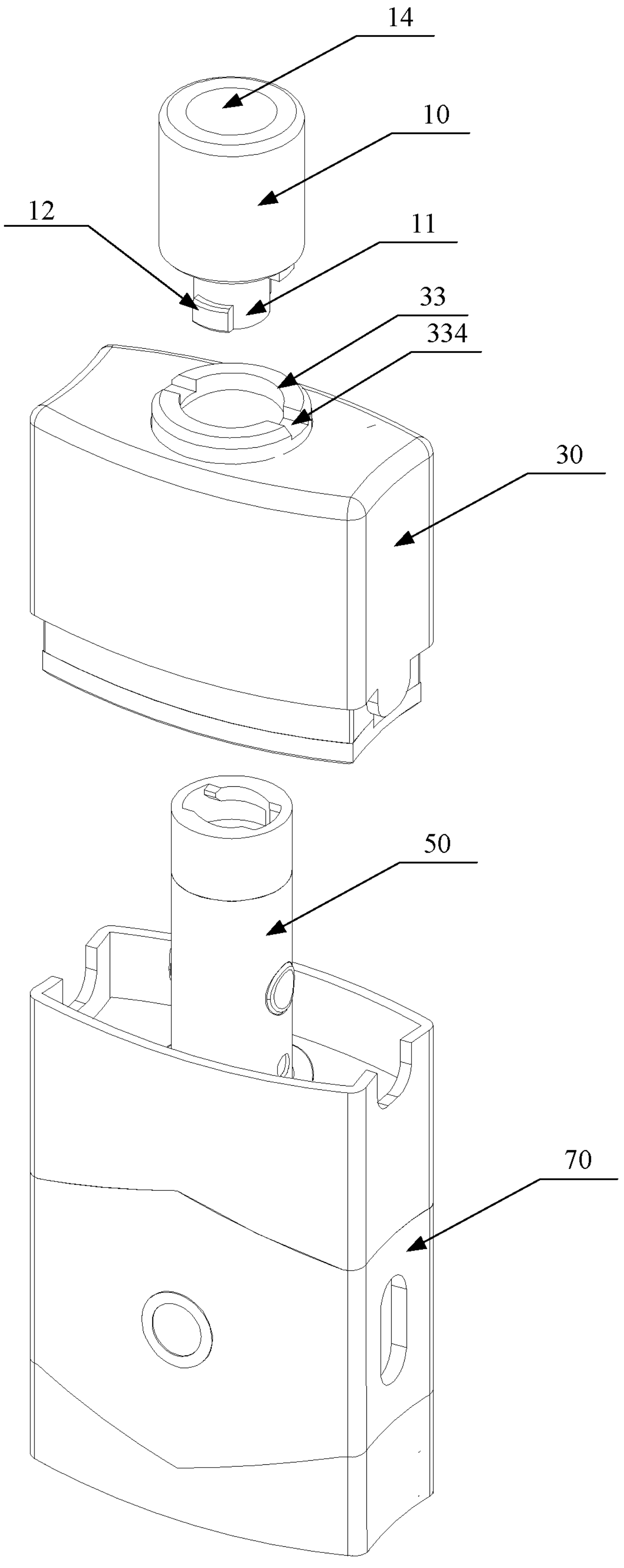
FIG. 2 is an exposed view of an aerosol-generating article in FIG. 1.

Referring to FIG. 1 and FIG. 2, the present disclosure relates to a detachable aerosol-generating article 100 that may be but not limited to a disposable aerosol-generating article 100. The aerosol-generating article 100 includes a mouthpiece 10, a cartridge 30, an atomizer 50 and a power supply device 70.

Figure 4:
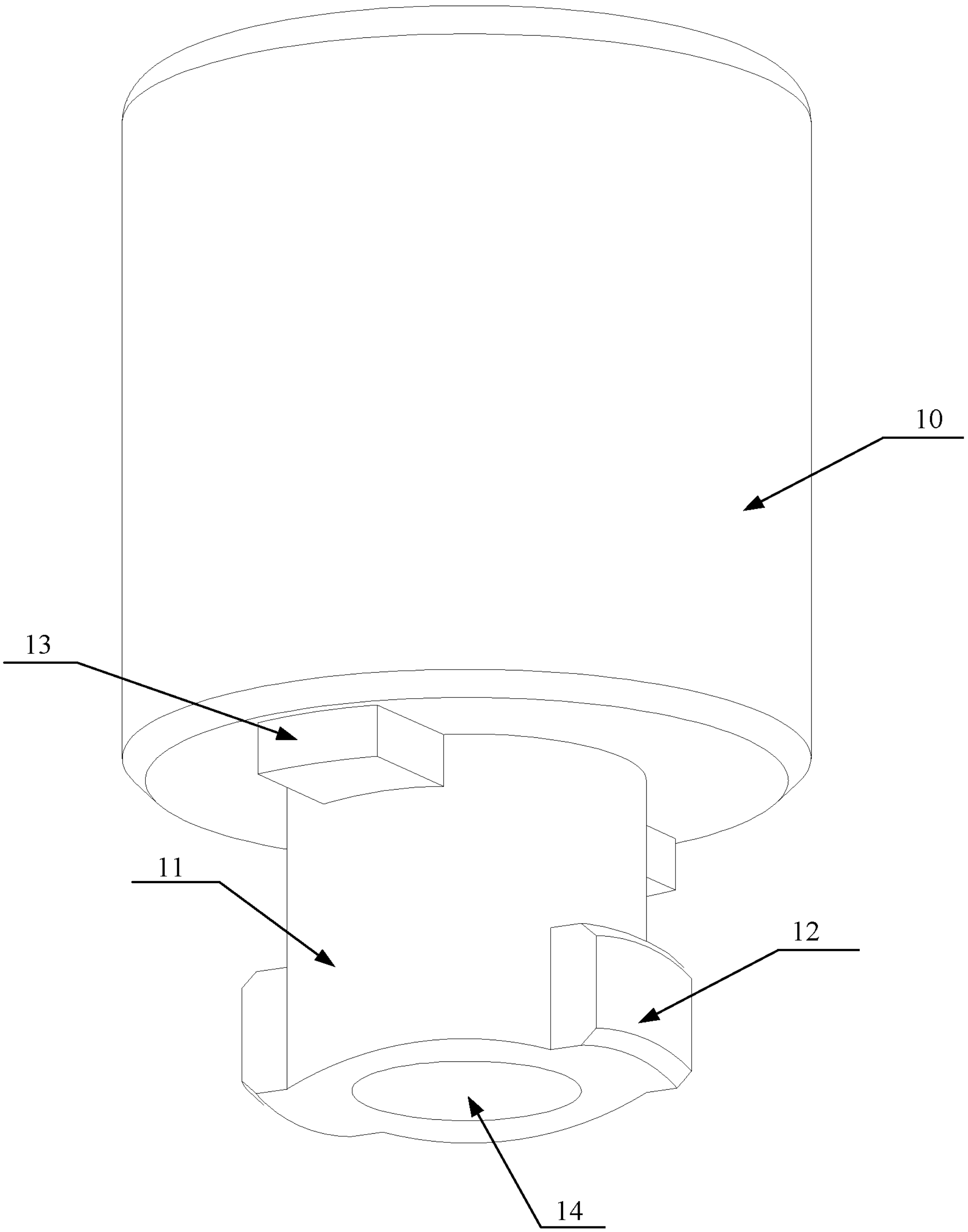
FIG. 4 is an aspect view of a mouthpiece in the aerosol-generating article in FIG. 2.

Referring to FIG. 4, the mouthpiece is at a mouth end of the detachable aerosol-generating article 100, and a distal end of the detachable aerosol-generating article 100 is upstream from the mouth end. Upstream of the mouthpiece has a shaft 11. The shaft 11 has a first protrusion 12 and a second protrusion 13 formed thereon. The first protrusion 12 is upstream of the shaft 11 while the second protrusion 13 is downstream of the first protrusion 12.

In the embodiment, the number of the first protrusions 12 and the second protrusions 13 is two, the first protrusions 12 and the second protrusions 13 are staggered along a circumferential direction of the shaft 11. Of course, in other embodiments, the number of the first protrusions 12 and the second protrusions 13 are determined based on actual need, no further limitation herein.

Inside of the mouthpiece 10 has an aerosol outlet path 14. In the embodiment, the aerosol outlet path 14 is extending through the mouthpiece 10.

Figure 5:
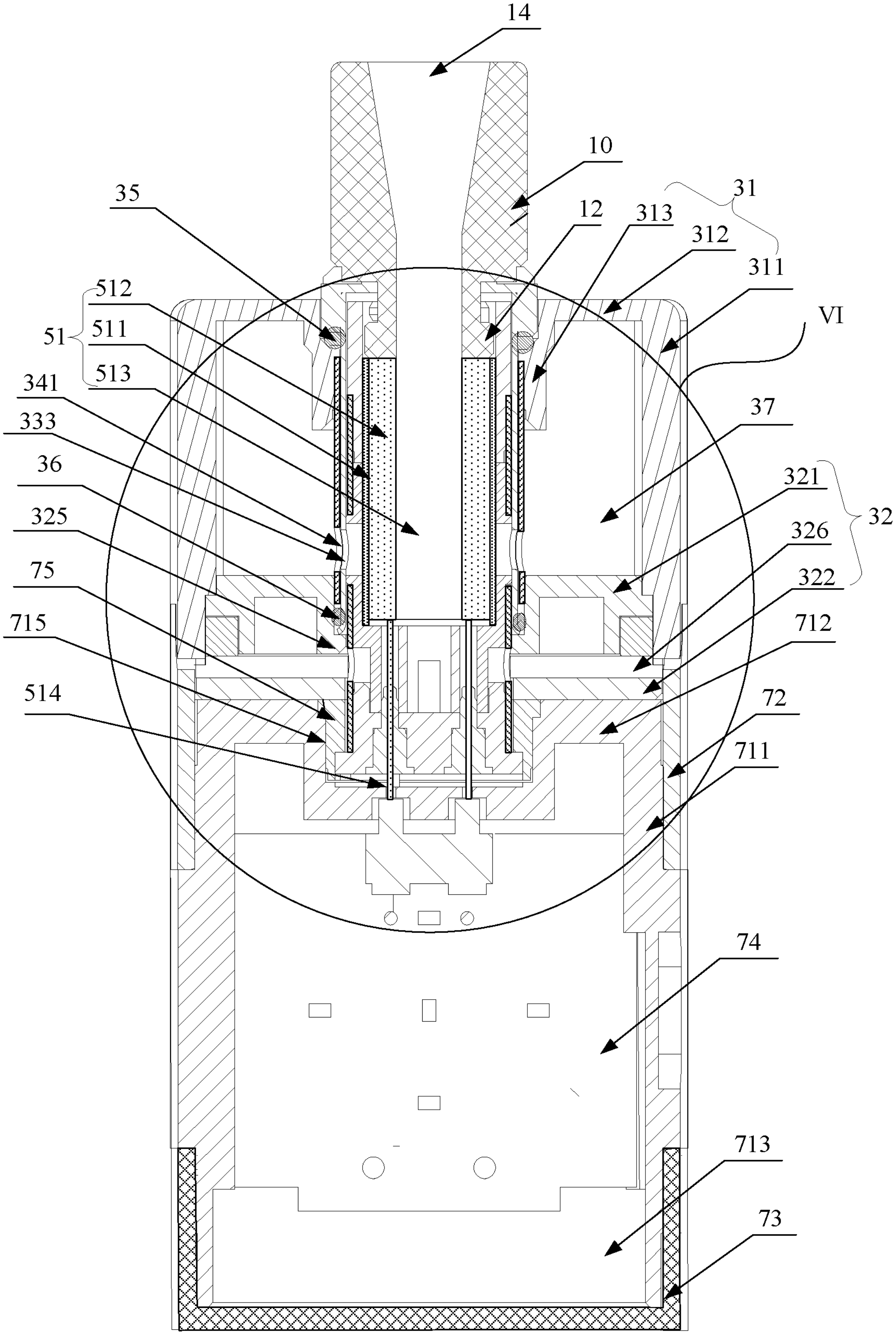
FIG. 5 is a cross-sectional view of the aerosol-generating article in FIG. 1 in a first state.
Figure 6:
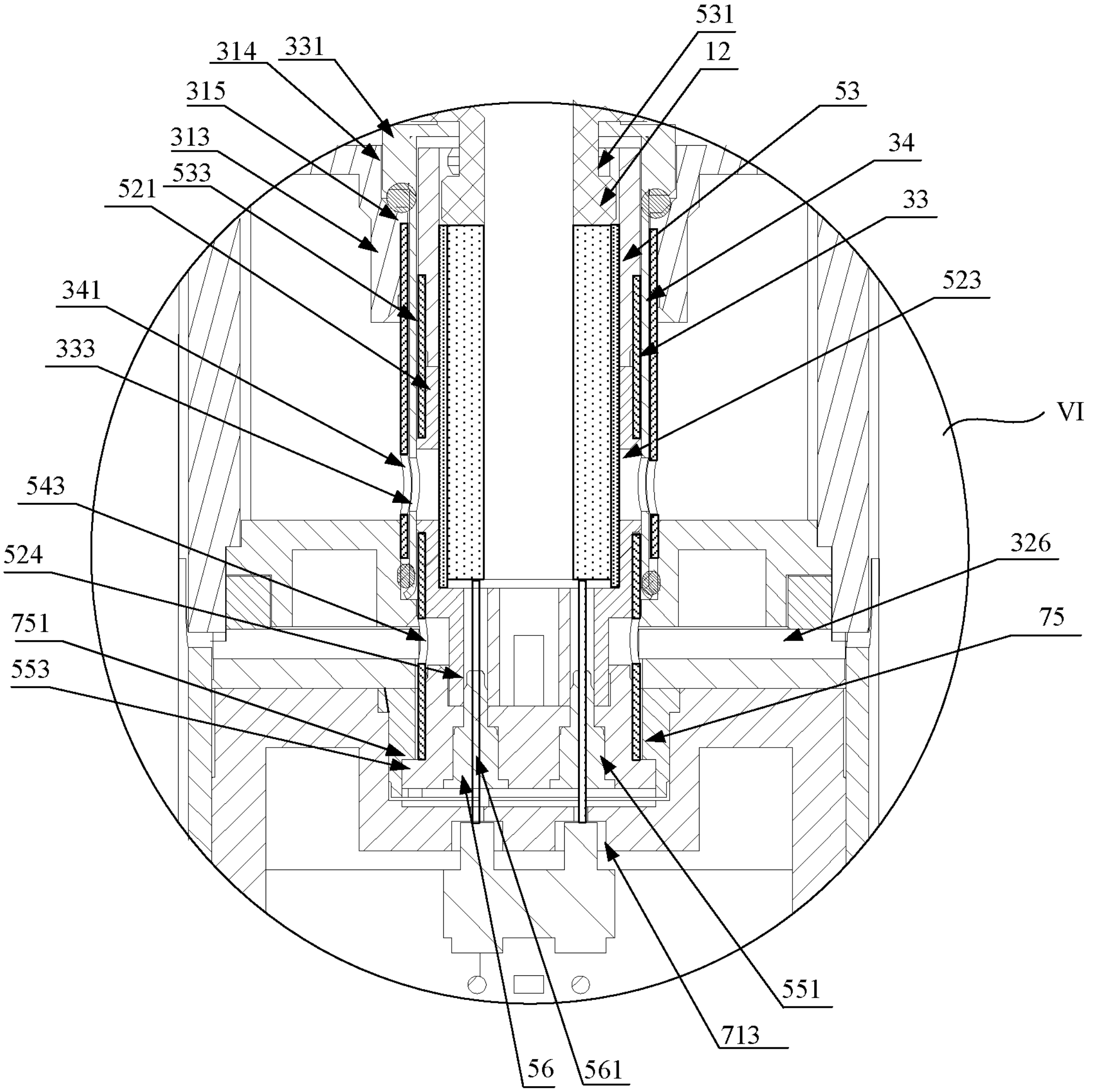
FIG. 6 is an enlarged view of VI area in FIG. 5.
Figure 7:
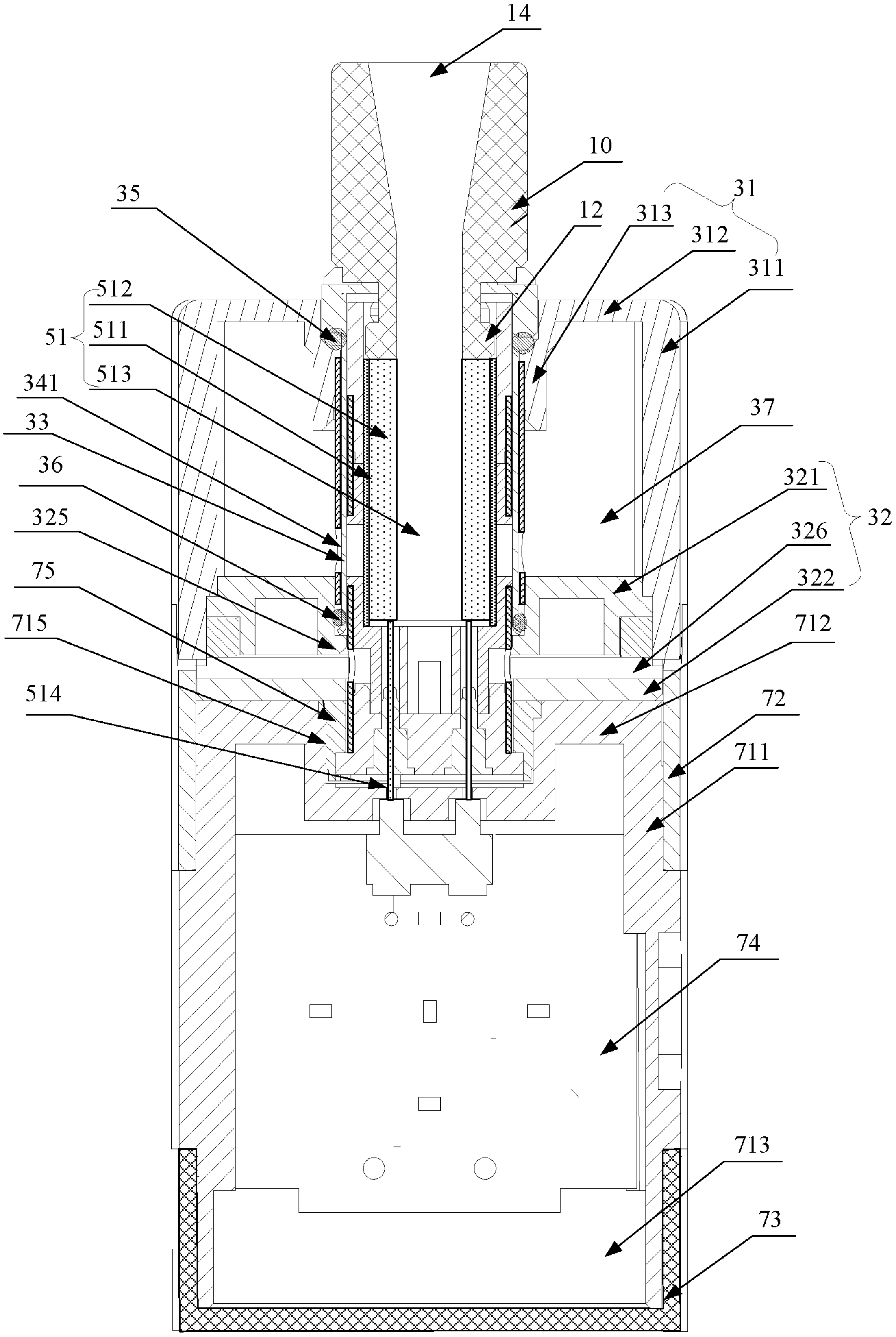
FIG. 7 is a cross-sectional view of the aerosol-generating article in FIG. 1 in a second state.

Referring to FIG. 5, FIG. 6 and FIG. 7, the cartridge 30 includes a first shell 31, a base 32, a first tube 33, a second tube 34, a first sealing ring 35 and a second sealing ring 36.

The base 32 is disposed upstream of the first shell 31; the first tube 33 is extending through the first shell 31 towards the base 32. The first tube 33, the first shell 31 and the base 32 encompass a reservoir 37. And a first tube 33 has a path 330 formed therein.

More specifically, the first shell 31 includes a first sidewall 311 and a first top wall 312. The first top wall 312 has a sleeve 313 with a first through hole 314 bored thereon. In the embodiment, the first through hole 314 may be a step hole.

Each of two ends of the first tube 33 has a fixing part 331 and a folding part 332. Inside wall of the first through hole 314 protrudes a bump 315. The first tube 33 passes through the first through hole 314 so that the fixing part 331 abuts against the bump 315 inside the first through hole 314, in this case, the first tube 33 is secured on the first shell 31.

The base 32 includes a first base 321 and a second base 322. The first base 321 is configured for sealing the reservoir 37. The second base 322 being upstream of the first base 321 is configured for securing the first base 321 with the first shell 31.

As used herein, the first base 321 is bored with a second through hole 323; the second base 322 is bored with a third through hole 324. The first through hole 314, the second through hole 323 and the third through hole 324 are aligned to each other.

In the embodiment, upstream of the first base 321 has a fixing block 325, the folding part 332 of the first tube 33 abuts against the fixing block 325 with consequently securing the first tube 33.

Furthermore, the first sealing ring 35 is disposed between the fixing part 331 and the bump 315; the second sealing ring 36 is disposed between the folding part 332 and the first base 321 to avoid leakage of the tobacco liquid in the reservoir 37.

Understandably, between the fixing part 331 of the first tube 33 and the bump 315, and between the folding part 332 and the first base 321 respectively have sealing rings that are used for separating the reservoir 37 from the external atmosphere, exerting a better sealing effect and therefore effectively avoiding leakage of tobacco liquid in the reservoir 37.

The second tube 34 is sleeved on the first tube 33. An end of the second tube 34 is imbedded between the sleeve 313 and the first tube 33, an opposite end thereof is imbedded between the first base 321 and the folding part 332, therefore the second tube 34 is secured.

In the embodiment, referring to FIG. 6 and FIG. 7, the first tube 33 is bored with a first liquid conductive hole 333, the second tube 34 is bored with a second liquid conductive hole 341. When the cartridge 30 is assembled with the atomizer 50, the first liquid conductive hole 333 is aligned with the second liquid conductive hole 341; when the cartridge 30 is disassembled with the atomizer 50, the first liquid conductive hole 333 is misaligned with the second liquid conductive hole 341 to avoid leakage of tobacco liquid.

Figure 9:
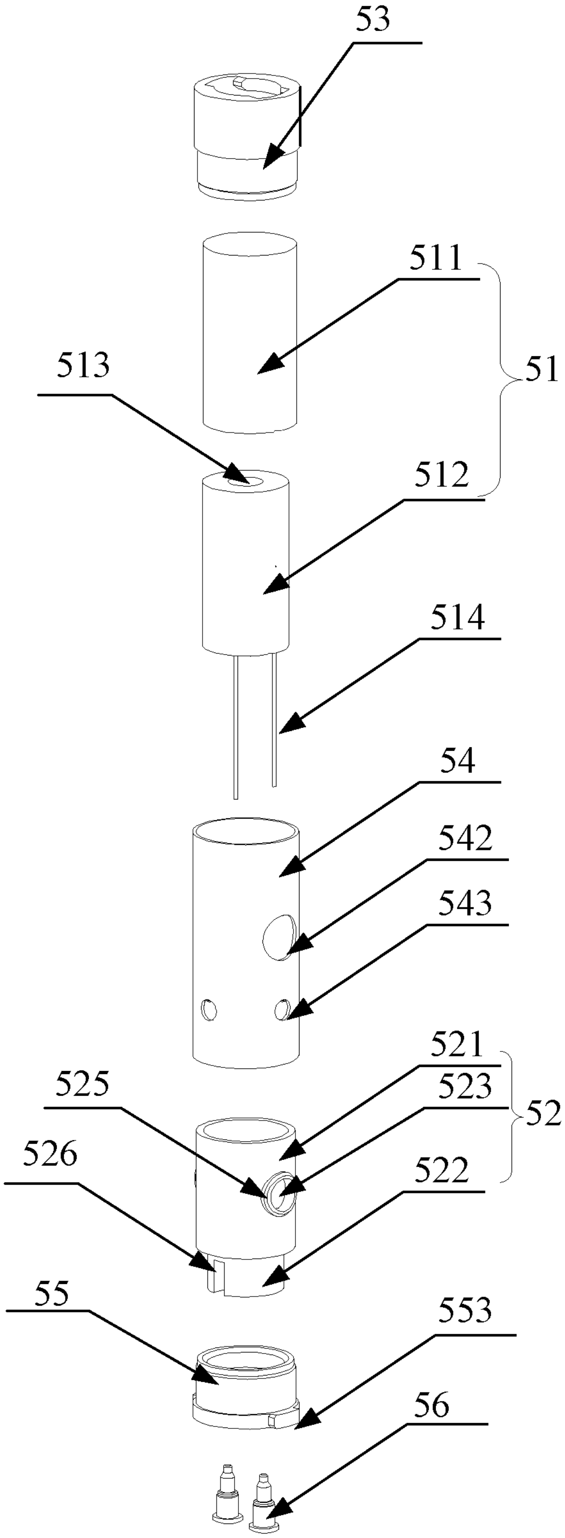
FIG. 9 is an exploded view of an atomizer in the aerosol-generating article in FIG. 2.

Referring to FIG. 5, FIG. 6 and FIG. 9, the atomizer 50 is disposed in the path 330, the atomizer 50 includes an atomizing assembly 51, a supporter 52, a connector 53, a third tube 54, a basal plug 55 and a retainer 56.

The atomizing assembly 51 includes a liquid conductive element 511 and a heater 512, the liquid conductive element 511 is sleeved on the heater 512, inside of the heater 512 has an air flow path 513.

Understandably, in practice, the air flow path 513 is in communication with the aerosol outlet path 14, such that the atomizing assembly 51 absorbs the tobacco liquid in the reservoir 37 to heat, generating an aerosol drawn by the user through the aerosol outlet path 14.

The supporter 52 is sleeved on the liquid conductive element 511, the supporter 52 includes a receivable part 521 and a connecting part 522. The receivable part 521 is imbedded in the path 330 for receiving the atomizing assembly 51. The receivable part 521 is hollow and the atomizing assembly 51 is disposed inside the receivable part 521.

In the embodiment, the receivable part 521 is bored with a third liquid conductive hole 523, the third liquid conductive hole 523 is aligned with the second liquid conductive hole 341. When the cartridge 30 is secured with the atomizer 50, the tobacco liquid in the reservoir 37 flows through the second liquid conductive hole 341, the first liquid conductive hole 333 and the third liquid conductive hole 523 towards the liquid conductive element 511, further atomized by the heater 512 to form the aerosol.

The connecting part 522 is disposed upstream of the atomizing assembly 51, secured with the basal plug 55. More specifically, the basal plug 55 has a first step hole 551. The connecting part 522 is bored with a connecting hole 524 that is aligned with the first step hole 551, enabling the retainer 56 to successively pass through the first step hole 551 and the connecting hole 524 so as to secure the supporter 52 with the basal plug 55. In the embodiment, the retainer 56 is but not limited to a screw bolt.

The basal plug 55 is disposed upstream of the air flow path 513, avoiding the tobacco liquid leaking out from the atomizing assembly 51.

Figure 10:
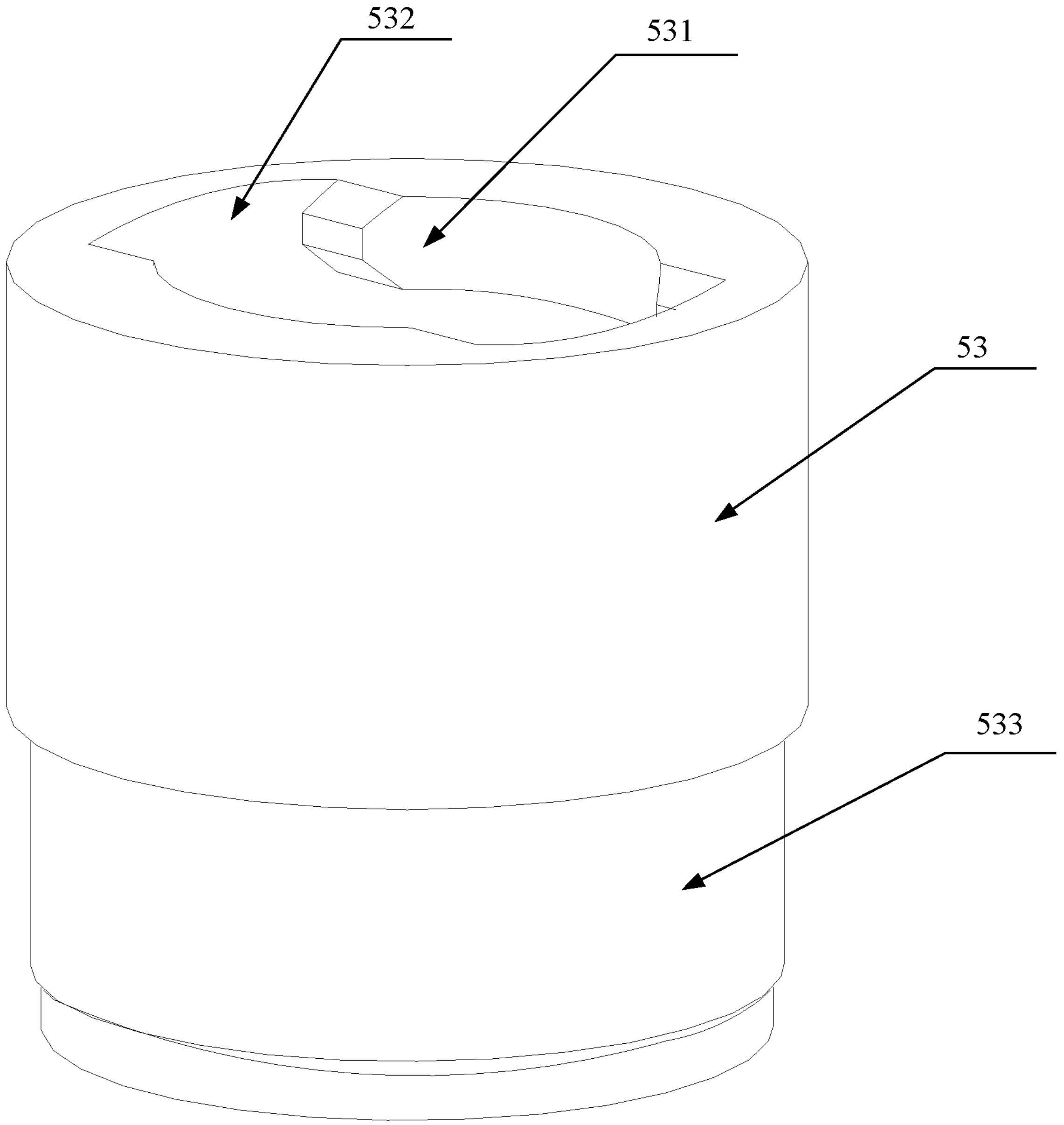
FIG. 10 is an aspect view of a connector in the atomizer in FIG. 9.

Referring to FIG. 4 and FIG. 10, the connector 53 is disposed inside the path 330. The connector 53 and the supporter 52 are sleeved on the liquid conductive element 511. A clamping portion 531 is formed on inside wall of the connector 53 downstream of the supporter 52. The clamping portion 531 is connected with the first protrusion 12 via snap joint, thus the connector 53 is connected with the mouthpiece 10, in this case, the mouthpiece 10 is detachably connected with the atomizer 50.

In the embodiment, the shaft 11 has two first protrusions 12, accordingly, the inside wall of the connector 53 has two symmetrically-set clamping portions 531. Between the two clamping portions 531 there is a notch 532. When assembling the cartridge 30 and the atomizer 50, the first protrusion 12 inserts into the notch 532, extending to the clamping portions 531, then the mouthpiece 10 is rotated to finish the assembling of the cartridge 30 and the atomizer 50. When disassembling the cartridge 30 and the atomizer 50, the mouthpiece 10 is rotated such that the first protrusions 12 are rotated to the notches 532, then removing the mouthpiece 10 from the connector 53. The above connection has a simple structure and is easy to operate.

Understandably, by replying on the connector 53 of the atomizer 50 secured with the shaft 11 of the mouthpiece 10 in the path 330, the cartridge 30 is secured with the atomizer 50 when the mouthpiece 10 is secured with the atomizer 50. When the mouthpiece 10 is removed from the atomizer 50, the cartridge 30 is detached with the atomizer 50. If so, when the tobacco liquid in the cartridge 30 is used up, the cartridge 30 is replaced only but the atomizer 50 can be reused, which may avoid cost-wasting and improve competition of the products.

Figure 8:
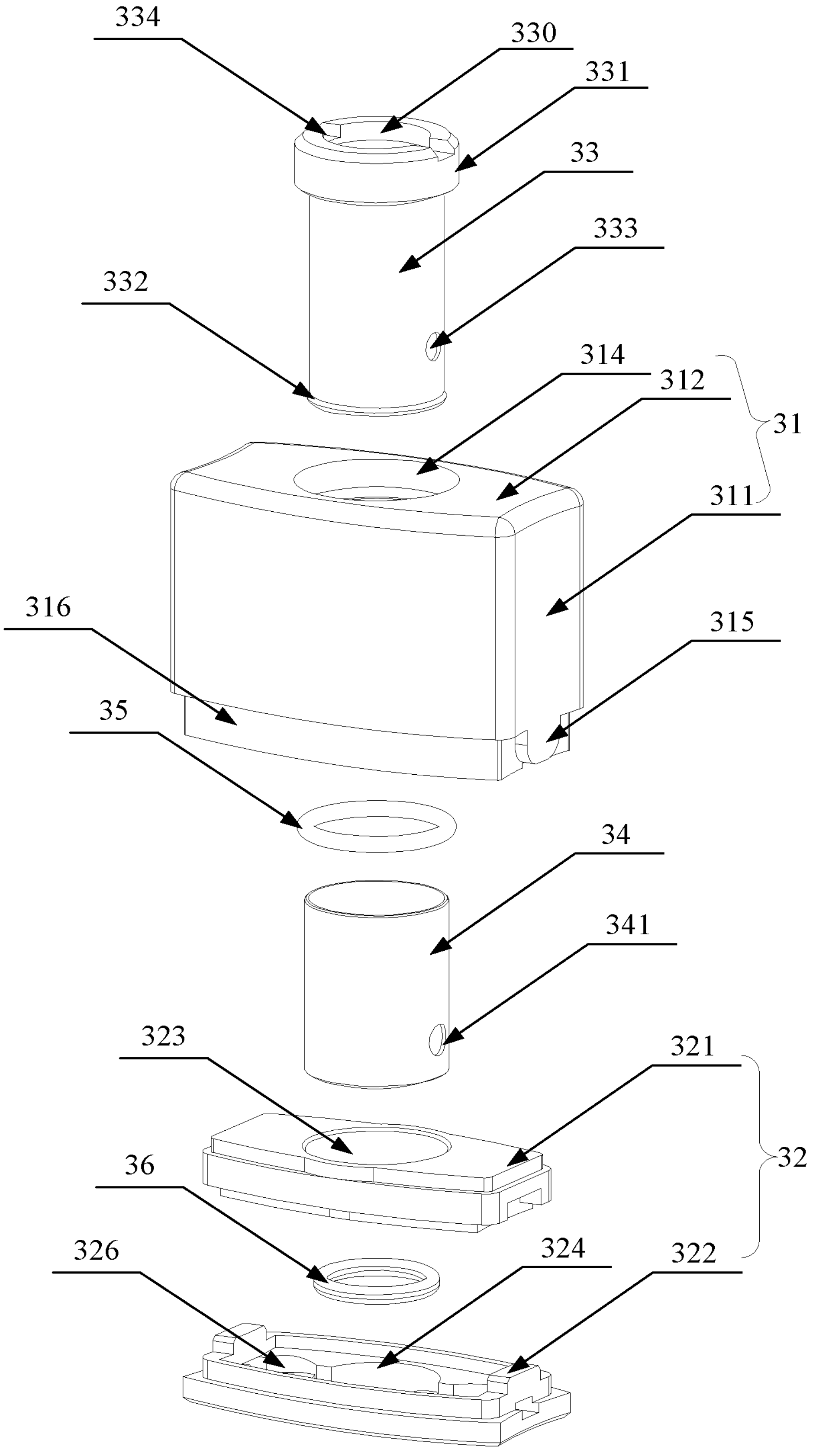
FIG. 8 is an exploded view of a cartridge in the aerosol-generating article in FIG. 2.

Furthermore, referring to FIG. 8, the fixing part 331 of the first tube 33 is bored with a groove 334, the second protrusion 13 is received in the groove 334. In this case, the mouthpiece 10 is rotated to bring the first tube 33 to rotate.

Understandably, when the cartridge 30 and the atomizer 50 are assembled, the first liquid conductive hole 333 is aligned with the second liquid conductive hole 341, the tobacco liquid flows respectively through the second liquid conductive hole 341, the first liquid conductive hole 333 to the liquid conductive element 511, eventually aerosolized. When the cartridge 30 needs to be removed from the atomizer 50, rotating the mouthpiece 10 causes the first tube 33 to rotate simultaneously, in this case, the first liquid conductive hole 333 and the second liquid conductive hole 341 are misaligned which may effectively avoid leakage of the tobacco liquid in the reservoir 37.

Upstream of the connector 53 is formed with a first concave part 533, an outer diameter of the first concave part 533 is equal to an outer diameter of the receivable part 521 and an outer diameter of the basal plug 55. The third tube 54 is sleeved on the first concave part 533 of the connector 53, the supporter 52 and the basal plug 55 so as to secure them.

Furthermore, the supporter 52 protrudes towards the first tube 33 to form a casing wall 525 encircling the third liquid conductive hole 523. The third tube 54 is bored with a fixing hole 542 that is sleeved on the casing wall 525, therefore securing the third tube 54 on the supporter 52.

Furthermore, the third tube 54 is bored with a round hole 543. An downstream side of the second base 322 is bored with an aeration slot 326 for forming an air inlet path when the first base is engaged with the second base; the round hole is in communication with the air inlet path, thus the air inlet path is in communication with the air flow path 513. Therefore, the air may flow through the air inlet path to the atomizing assembly 51.

In this embodiment, the third tube 54 is bored with four round holes 543. Of course, in other embodiments, the number of round holes 543 is determined according to the actual need, which is not limited herein.

In the embodiment, as shown in FIG. 9, the outer diameter of the connecting part 522 of the supporter 52 is less than the outer diameter of the receivable part 521, thus when the third tube 54 is sleeved on the supporter 52, a space is formed between an inside wall of the third tube 54 and an outside wall of the connecting part 522. Furthermore, the connecting part 522 of the supporter 52 is bored with an air conductive hole. And upstream of the connecting part 522 is bored with an air conductive slot 526. In this case, the external air may successively flow through the air inlet path, the round hole 543, the air conductive hole to the air flow path 513.

Furthermore, in a preferred embodiment, the first tube 33, the second tube 34 and the third tube 54 are all made of stainless steel.

Figure 11:
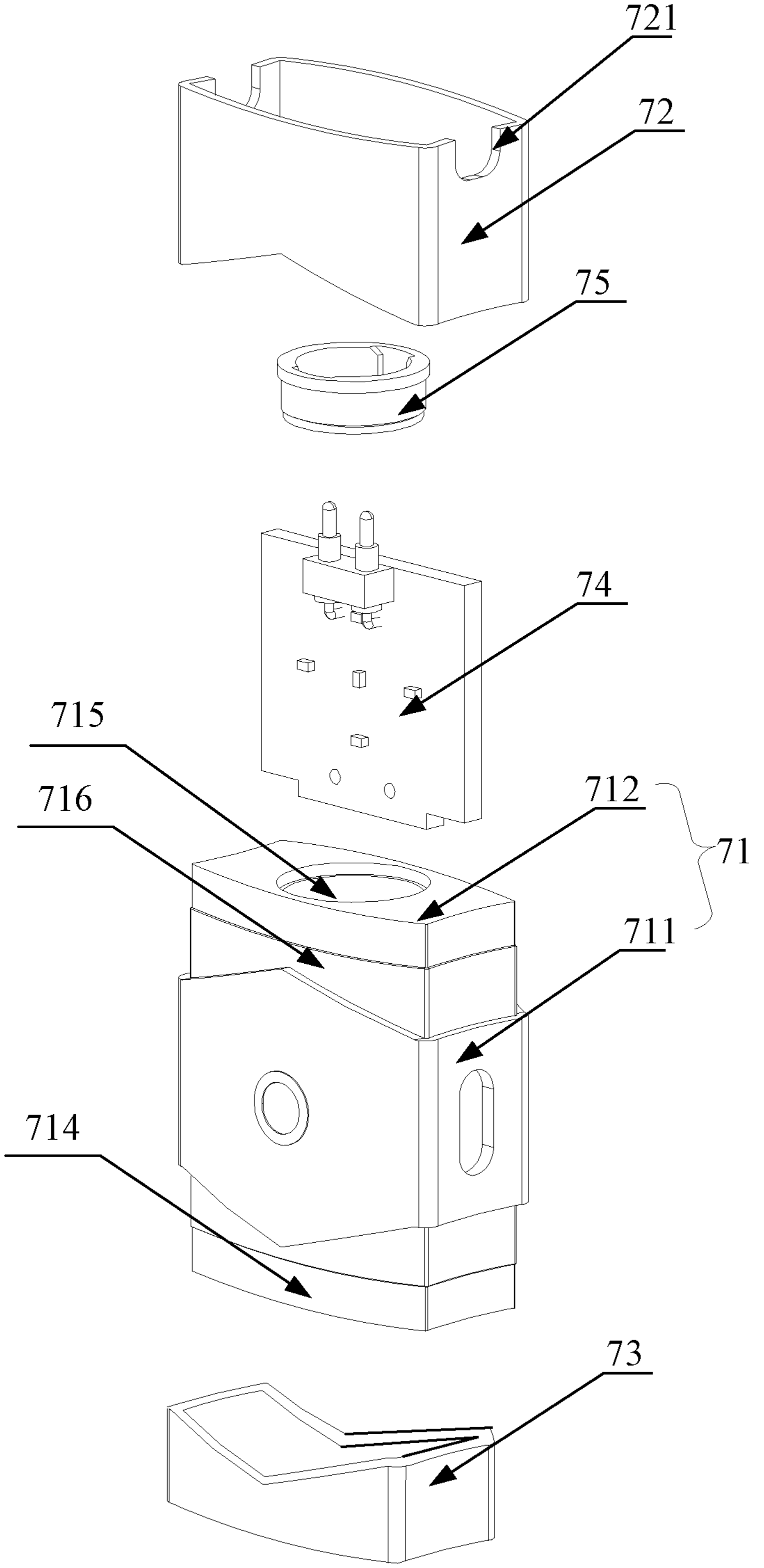
FIG. 11 is an exploded view of a power supply module in the aerosol-generating article in FIG. 2.

Referring to FIG. 5, FIG. 6 and FIG. 11, the power supply device 70 includes a second case 71, a third case 72, an end case 73, a power supply set 74 and a carrier 75.

The second case 71 includes a second side wall 711 and a second top wall 712. The second top wall 712 encompasses the second top wall 712. The end case 73 is sleeved on upstream of the second case 71 to form a second step hole 713 with the second case 71. The second step hole 713 is configured for receiving the power supply set 74.

In the embodiment, upstream of the second side wall 711 has a second concave part 714, the end case 73 is sleeved on the second concave part 714 to secure with each other.

The second top wall 712 has a compartment 715 concaved thereon. The compartment 715 is configured for receiving the carrier 75.

The carrier 75 abuts an inside wall of the compartment 715. In which, the carrier 75 is hollow, the basal plug 55 is imbedded into the carrier 75. In the embodiment, upstream of the basal plug 55 has a third protrusion 553, accordingly, upstream of the carrier 75 is bored with a clamping portion 751. The third protrusion 553 is connected with the clamping portion 751 via snap joint to avoid relatively sliding of the carrier 75 and the basal plug 55 and thus the carrier 75 is secured on the basal plug 55.

In the embodiment, two third protrusions 553 and two clamping portions 751 are provided herein. The clamping portions 751 and the clamping portions 531 have the same structure. Of course, in other embodiments, the structure of the clamping portion 751 is the same as the structure of the groove 334, which is no more limitation herein.

The heater 512 further includes an electrode mast 514, the retainer 56 is bored with a through hole 561, upstream of the compartment 715 is bored with a second step hole 713, allowing the electrode mast 514 to successively pass through the through hole 561 and the second step hole 713 to be electrically connected with the power supply set 74, therefore supplying power to the heater 512 for atomizing the tobacco liquid.

The third case 72 is sleeved on at least part of the first shell 31 and the second case 71 so as to secure the first shell 31 and the second case 71.

More specifically, as shown in FIG. 5, upstream of the first side wall 311 of the first shell 31 is dented to form a third concave part 316, downstream of the second side wall 711 of the second case 71 is dented to form a fourth concave part 716. The third case 72 is sleeved on the third concave part 316 and the fourth concave part 716, so the first shell 31 is secured with the second case 71.

Figure 3:
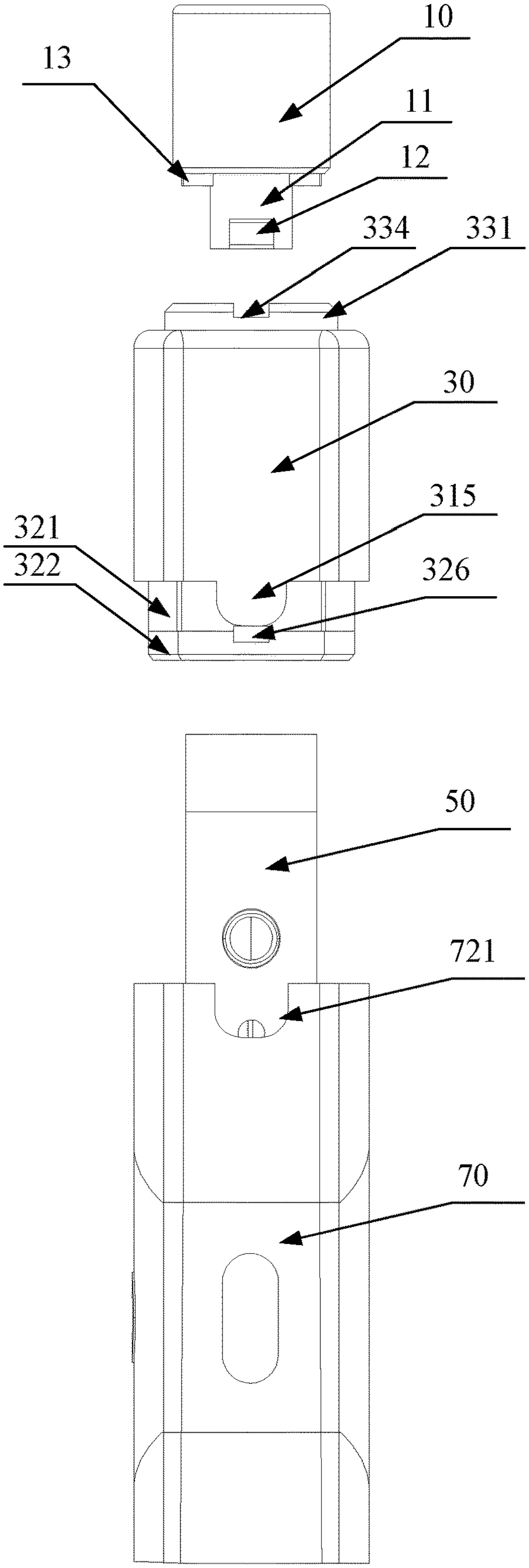
FIG. 3 is another exposed view of an aerosol-generating article in FIG. 1 from another perspective.

Furthermore, referring to FIG. 1 and FIG. 3, downstream of the third case 72 is dented to form a recess 721, upstream of the first shell 31 protrudes to form a bump 315, the bump 315 is clamped in the recess 721 so as to secure the first shell 31 on the third case 72. In which, a seam 722 appears between a surface of the recess 721 and the bump 315, the seam 722 is in communication with the air flow path 513, allowing external air to flow smoothly into the air flow path.

Compared with the prior art, by using that the connector 53 of the atomizer 50 is secured with the shaft 11 of the mouth piece 10 in the path 330 that is formed inside the cartridge 30, when the mouthpiece 10 is secured with the atomizer 50, the cartridge 30 is secured with the atomizer 50 too; when the mouthpiece 10 is removed from the atomizer 50, the cartridge 30 is detached from the atomizer 50, therefore, upon the tobacco liquid in the cartridge 30 is used up, only need to replace the cartridge 30 but the atomizer 50 can be reused, the electrically-operated aerosol generating article 100 may effectively avoid cost-wasting and make the products more competitive over time.

The illustrated methods are exemplary only. Although the methods are illustrated as having a specific operation flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A detachable aerosol-generating article comprising:

an atomizer;

a cartridge having a reservoir with a path formed inside the reservoir; the cartridge being detachably connected to the atomizer, the reservoir containing a tobacco liquid; and a mouthpiece detachably connected to the atomizer;

wherein the cartridge further comprises a first tube and a second tube, the second tube being sleeved on the first tube, and the first tube and the second tube being rotatable relative to each other; the first tube being bored with a first liquid conductive hole, the second tube being bored with a second liquid conductive hole;

wherein the path formed inside the reservoir is also formed inside the first tube;

wherein the cartridge and the atomizer are configured such that when they are assembled, the first liquid conductive hole is aligned with the second liquid conductive hole, thus allowing the tobacco liquid in the reservoir to flow into the atomizer;

wherein the cartridge and the atomizer are further configured such that when they are detached, the first liquid conductive hole and the second liquid conductive hole are misaligned with each other, thus preventing the tobacco liquid in the reservoir from leaking out;

wherein the cartridge, the atomizer, and the mouthpiece are configured such that when they are assembled, the atomizer extends through the path of the reservoir and the first tube to engage with the mouthpiece, and the mouthpiece is configured such that the cartridge is secured to the atomizer.

2. The detachable aerosol-generating article according to claim 1, wherein the detachable aerosol-generating article further comprises a distal end of the detachable aerosol-generating article, the distal end is upstream from the mouth end; wherein the mouthpiece, at its upstream end, has a shaft with protrusions, and the atomizer has a connector; wherein the shaft enables the mouthpiece to detachably connect to the atomizer via the connector in the path such that when the mouthpiece is secured to the atomizer, the atomizer is secured to the cartridge; and when the mouthpiece is detached from the atomizer, the cartridge is detached from the atomizer, and the cartridge is also detached from the mouthpiece.

3. The detachable aerosol-generating article according to claim 2, wherein the shaft comprises a first protrusion, the connector has a clamping portion at a downstream end thereof, wherein the first protrusion is clamped by the clamping portion.

4. The detachable aerosol-generating article according to claim 3, wherein the shaft comprises a second protrusion, and the first tube has a groove at a downstream end thereof; and wherein the second protrusion is received in the groove such that the first tube rotates with the mouthpiece.

5. The detachable aerosol-generating article according to claim 4, wherein the cartridge comprises a first shell and a base; the base being disposed upstream of the first shell; wherein the first tube is carried on the first shell and extends to the base; and wherein the first tube, the first shell and the base encompass a reservoir.

6. The detachable aerosol-generating article according to claim 5, wherein the atomizer comprises an atomizing assembly disposed inside the path; wherein the atomizing assembly comprises a heater and a liquid conductive element, the liquid conductive element is sleeved on the heater; an air flow path extends inside the heater.

7. The detachable aerosol-generating article according to claim 6, wherein the base comprises a first base and a second base, the second base being upstream of the first base; wherein a downstream side of the second base is bored with an aeration slot for forming an air inlet path when the first base is engaged with the second base; and wherein the air inlet path is in communication with the air flow path.

8. The detachable aerosol-generating article according to claim 6, wherein the atomizer further comprises a supporter, the supporter having a receivable part; wherein the receivable part and the connector abut each other and both are sleeved on the liquid conductive element; and wherein the receivable part is bored with a third liquid conductive hole, the third liquid conductive hole being aligned with the second liquid conductive hole.

9. The detachable aerosol-generating article according to claim 8, wherein the supporter comprises a connecting part; wherein the atomizer comprises a third tube and a basal plug; the basal plug is secured with the connecting part; and wherein the third tube is sleeved on the connector, the supporter and the basal plug such that the connector, the supporter and the basal plug are secured.

10. The detachable aerosol-generating article according to claim 9, wherein the detachable aerosol-generating article further comprises a power supply device, the power supply device comprising a power supply set; wherein the power supply set is disposed inside the power supply device; and wherein the heater further comprises an electrode mast, the electrode mast successively passing through the connecting part and the basal plug to electrically connect the power supply set for supplying power to the heater to atomize the tobacco liquid.

* * * * *